(12) United States Patent
Amano et al.

(10) Patent No.: US 7,377,460 B2
(45) Date of Patent: May 27, 2008

(54) TAPE CARTRIDGE OF COMPATIBLE TYPE

(75) Inventors: Kosuke Amano, Ibaraki (JP); Toshiro Nishiwaki, Ibaraki (JP); Kenji Ota, Ibaraki (JP); Akihiro Yasui, Ibaraki (JP)

(73) Assignee: Hitachi Maxell Ltd., Osaka (JP)

( * ) Notice: Subject to any disclaimer, the term of this patent is extended or adjusted under 35 U.S.C. 154(b) by 299 days.

(21) Appl. No.: 10/964,626

(22) Filed: Oct. 15, 2004

(65) Prior Publication Data

US 2005/0174690 A1  Aug. 11, 2005

(30) Foreign Application Priority Data

Oct. 16, 2003  (JP) .......................... P 2003-356217
Nov. 11, 2003  (JP) .......................... P 2003-381009

(51) Int. Cl.
*G11B 23/087*  (2006.01)

(52) U.S. Cl. ...................... 242/344; 360/132

(58) Field of Classification Search ................ 242/336, 242/344; 360/74.6, 132
See application file for complete search history.

(56) References Cited

U.S. PATENT DOCUMENTS

| | | | |
|---|---|---|---|
| 4,032,987 A * | 6/1977 | Singer et al. ................ | 360/132 |
| 4,631,618 A | 12/1986 | Ozawa et al. | |
| 4,763,217 A | 8/1988 | Oishi | |
| 4,862,305 A | 8/1989 | Katagiri et al. | |
| 5,121,275 A | 6/1992 | Komiyama | |
| 5,239,437 A * | 8/1993 | Hoge et al. .................. | 360/132 |
| 5,316,236 A * | 5/1994 | Hasegawa et al. .......... | 242/336 |
| 5,390,870 A * | 2/1995 | Sawada et al. ............. | 242/344 |
| 5,479,312 A | 12/1995 | Masuda et al. | |

FOREIGN PATENT DOCUMENTS

| | | |
|---|---|---|
| EP | 0880138 A3 | 11/1998 |
| JP | 63-32791 A | 2/1988 |
| JP | 4-61680 A | 2/1992 |
| JP | 5-182323 A | 7/1993 |
| JP | 5-250841 A | 9/1993 |
| JP | 5-73761 U | 10/1993 |
| JP | 5-334847 A | 12/1993 |
| JP | 7-6558 A | 1/1995 |
| JP | 8-7592 A | 3/1996 |
| JP | 2000-100120 A | 4/2000 |
| JP | 2000-348464 A | 12/2000 |

* cited by examiner

*Primary Examiner*—John Q. Nguyen
(74) *Attorney, Agent, or Firm*—Birch, Stewart, Kolasch and Birch, LLP (57) ABSTRACT

A tape cartridge capable of recording and reading out large and small tape cartridges with different widths is provided. The tape cartridge comprises a pair of right and left hubs for winding a tape which is winded off from one hub and is wound around the other hub via tape guides. A passage for light injection and a passage for light ejecting of the tape end detection light are opened respectively on a side wall of a case of a main body facing a tape traveling path between the tape guide and the hub, and an optical path inverted body facing a pair of passages across the tape traveling path is arranged in the case of the main body. One of the passages for light injection and the passages for light ejecting in the large and small tape cartridges is formed at a prescribed distance from the reference surface.

6 Claims, 10 Drawing Sheets

TAPE CARTRIDGE OF COMPATIBLE TYPE

This Nonprovisional application claims priority under 35 U.S.C. § 119(a) on patent application No(s). P 2003-356217 & P 2003-381009 filed in Japan on Oct. 16, 2003 & Nov. 11, 2003; respectively, the entire contents of which are hereby incorporated by reference.

BACKGROUND OF THE INVENTION

1. Field of the Invention

The present invention relates to a tape cartridge of a compatible type capable of recording and reading out large and small tape cartridges with different widths (thickness measurements from upper face and lower face of the tape cartridges) in common with the same tape driver.

2. Description of the Related Art

It is known to public that large and small tape cartridges with different widths of their body cases can be recorded and read out in common with the same tape drive in this kind of tape cartridge (refer to: JP-A-5-250841 (paragraph 0022, FIG. 1) and JP-A-7-6558 (paragraph 0020, FIG. 1)). According to the tape cartridge disclosed in JP-A-5-250841, in order to absorb a difference of the widths and the measurements of the large and small tape cartridges, a recess portion is formed on a bottom surface of the large tape cartridge and the large and small tape cartridges are mounted in the same tape drive; and in this state, the recess portion is defined as a positioning reference in the large tape cartridge and a bottom surface of the lower case is defined as a positioning reference in the small tape cartridge, and thereby, heights of the tapes of the large and small tape cartridges inside of the tape drive are maintained constant so as to share upper and lower positions of the tape traveling path.

According to the tape cartridge disclosed in JP-A-7-6558, the center of traveling of the tape inside of the tape drive is defined as a reference position, and memory elements to be arranged in the large and small tape cartridges respectively are arranged at the same distance from the reference position. In the memory element, a specification and property of the tape, and the data of setting a device upon filming or the like are recorded.

According to the present invention, an optical path inverted body such as a prism is provided inside of a case of a main body. A detected light that is irradiated from a light emitting element outside of the case of the main body into the case is inversely guided toward a light receiving element outside of the case of the main body by the optical path inverted body so as to detect an end of the tape. A tape cartridge adopting such a classification of optical detection system is known to public in JP-UM-8-7592 (page. 2, a right column lines 29 to 35, FIG. 3).

In order to perform the light detection of the end of the tape, a passage for light injection and a passage for light ejecting are opened at side walls of the case of the main body facing to the optical path inverted body. In many cases, the passage for light injection is opened at an upward part of the side wall of the case, and the passage for light ejecting is formed facing a contact surface of the upper and lower cases. Therefore, when making the large and small tape cartridges with different widths of the cases compatible, in response to the passage for light injection and the passage for light ejecting of the large and small tape cartridges, two dedicated light emitting elements and two dedicated light receiving elements are disposed on the right and left sides of the tape drive respectively, namely, four elements are disposed in total, resulting in making the inner structure of the tape drive complicated and higher cost. It is also possible to dispose the light emitting element and the light receiving element respectively on the right and left sides of the tape drive, and the upper and lower positions of the light emitting element and the light receiving element are switched respectively. In this case, however, a driving mechanism is needed and this makes the structure more complicated.

SUMMARY OF THE INVENTION

An object of the present invention is to enable to perform light detection of tape ends of compatible type tape cartridges with different widths thereof in common by minimum necessary light emitting element and light receiving element that are disposed in a tape drive, so as to simplify a detection structure of the end of the tape to be provided in the tape drive, and to decrease the manufacturing cost.

According to a first aspect of the present invention, there is provided a compatible type tape cartridge capable of recording and reading out large and small tape cartridges with different widths in common with a same tape driver, which comprise:

a pair of right and left hubs for winding a tape arranged in a case of a main body, the pair of hubs being designed so that the tape winded off from one hub is winded around the other hub via tape guides arranged on the front, right, and left of the case of the main body and also the hubs being connected with start and terminal ends of the tape via leader tapes for detecting the tape ends, a passage for light injection and a passage for light ejecting of the tape end detection light opened respectively on a side wall of the case of the main body facing a tape traveling path between the tape guide and the hub, and an optical path inverted body facing the pair of passages and across the tape traveling path arranged in the case of the main body, wherein defining one of the upper and lower surfaces of the case of the main body as a reference surface, the passages for light injection and the passages for light ejecting in the large and small tape cartridges are formed at a prescribed distance from the reference surface, and upper and lower adjacent spaces between the passages for light injection and the passages for light ejecting in the large and small tape cartridges are set at substantially the same measurement.

Figure 1:
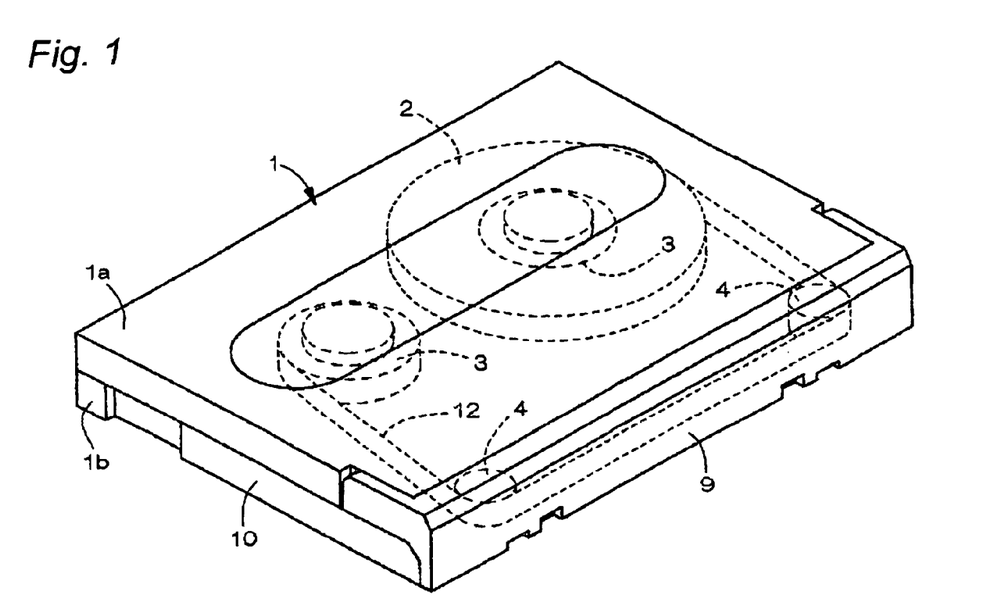
FIG. 1 is a perspective view showing a tape cartridge of a small size according to a first embodiment of the present invention.
Figure 2:
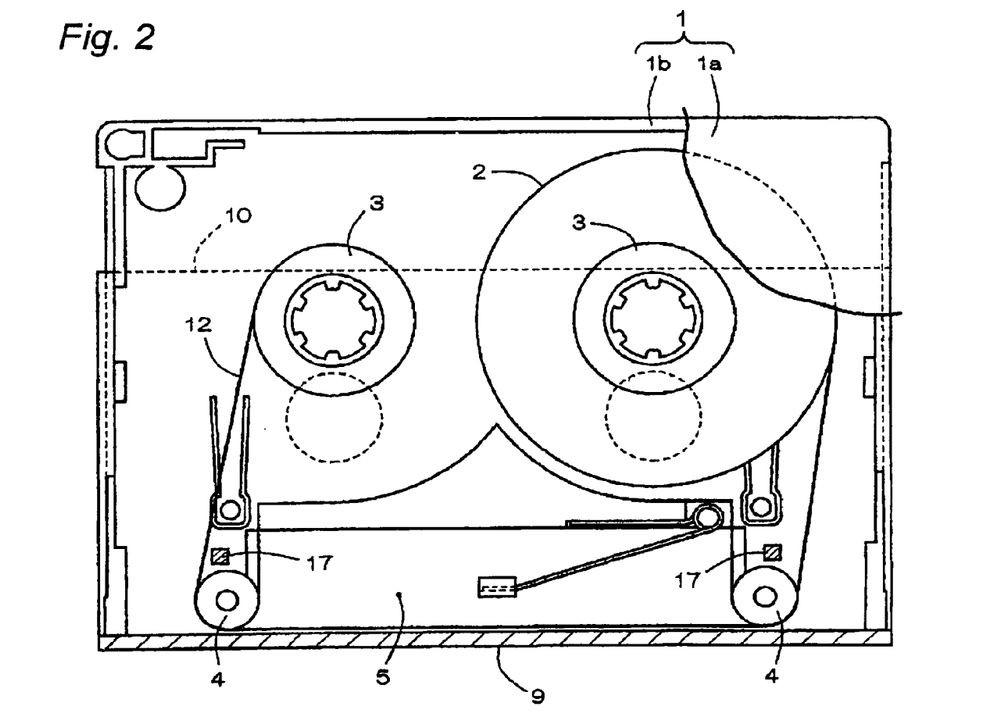
FIG. 2 is an inside plane view showing a tape cartridge of a small size according to a first embodiment of the present invention.

In a preferred embodiment of the compatible type tape cartridge capable of recording and reading out large and small tape cartridges C1 and C2 with different widths in common with the same tape driver, as shown in FIG. 1 and FIG. 2, the large and small tape cartridges C1 and C2, comprise a pair of right and left hubs 3 for winding a tape 2 which is arranged in a case of a main body 1, and are designed so that the tape 2 winded off from one hub 3 is winded around the other hub 3 via tape guides 4 that are arranged on the front, right, and left of the case of the main body 1. The both hubs 3 and start and terminal ends of the tape 2 are connected via leader tapes 12 for detecting the tape ends. A passage for light injection 15 and a passage for light ejecting 16 of the tape end detection light are opened respectively on a side wall 14 of the case of the main body 1 facing a tape traveling path between the tape guide 4 and the hub 3, and an optical path inverted body 17 facing a pair of the passages 15 and 16 across the tape traveling path is arranged in the case of the main body 1.

Figure 4A:
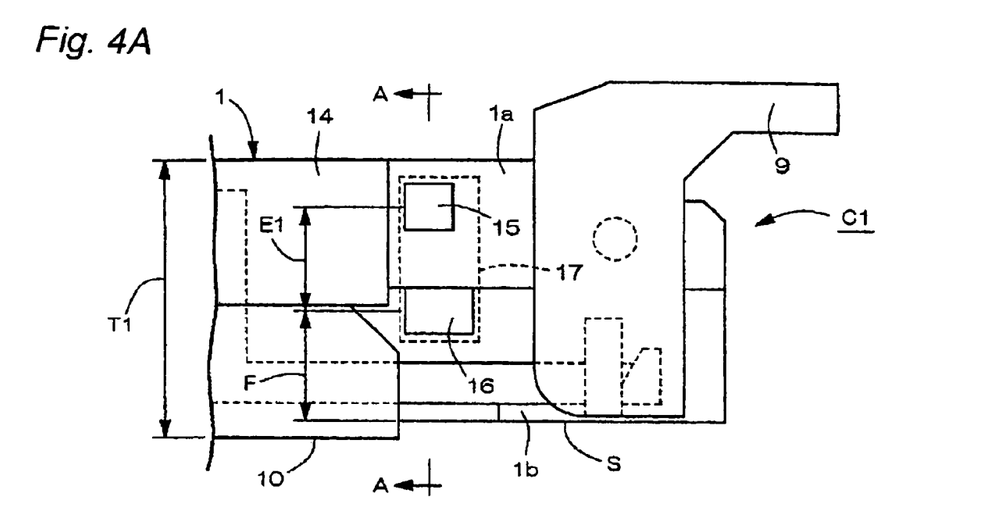
FIGS. 4A and 4B are side views showing large and small tape cartridges according to the first embodiment of the present invention.
Figure 4B:
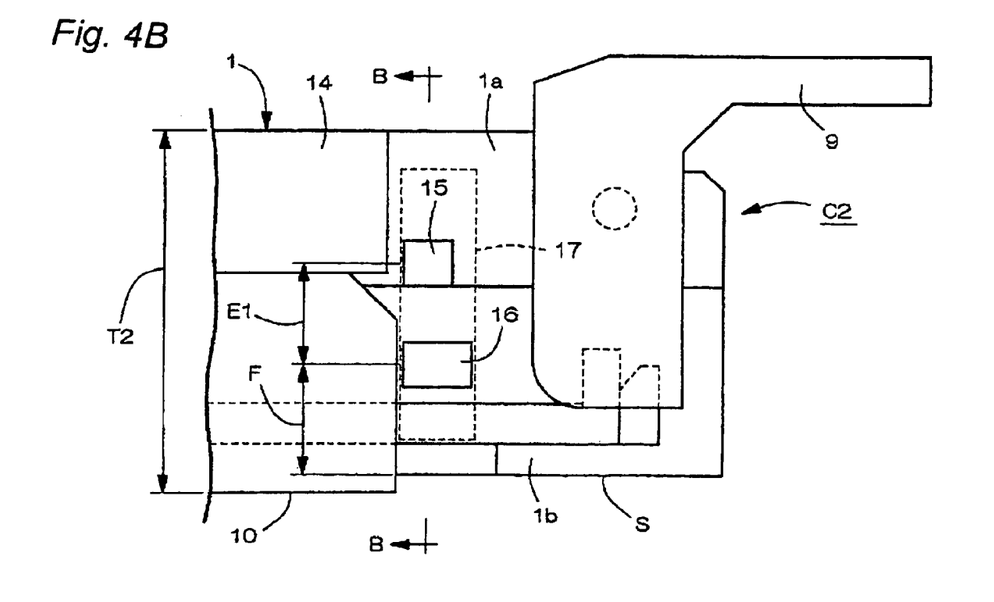

According to a first aspect of the present invention, in such a tape cartridge of a compatible type, as shown in FIG. 4, defining any one of the upper and lower surfaces of the case of the main body 1 as a reference surface S, the passages for light injection 15 and the passages for light ejecting 16 in the large and small tape cartridges C1 and C2 are formed at a prescribed distance F from the reference surface S, and upper and lower adjacent spaces E1 between the passages for light injection 15 and the passages for light ejecting 16 in the large and small tape cartridges C1 and C2 are set at substantially the same measurement.

According to a second aspect of the present invention, a compatible type tape cartridge capable of recording and reading out large and small tape cartridges with different widths in common with a same tape driver, which comprise:

a pair of right and left hubs for winding a tape arranged in a case of a main body, the pair of hubs being designed so that the tape winded off from one hub is winded around the other hub via tape guides arranged on the front, right, and left of the case of the main body and also the hubs being connected with start and terminal ends of the tape via leader tapes for detecting the tape ends, a passage for light injection and a passage for light ejecting of the tape end detection light opened respectively on a side wall of the case of the main body facing a tape traveling path between the tape guide and the hub, and an optical path inverted body facing the pair of passages and across the tape traveling path arranged in the case of the main body, wherein defining one of the upper an lower surfaces of the case of the main body as a reference surface, one of the passages for light injection and the passages for light ejecting in the large and small tape cartridges is formed at a prescribed distance from the reference surface, and upper and lower adjacent spaces between the passages for light injection and the passages for light ejecting in the large and small tape cartridges are different in response to a difference of widths and measurement of the case of the main body between the large and small tape cartridges.

Figure 7A:
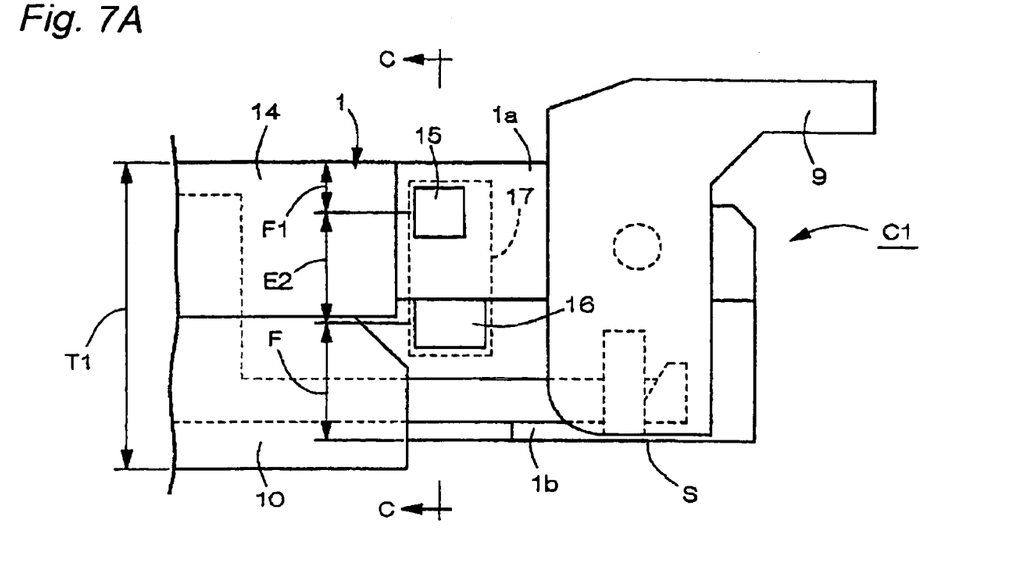
FIGS. 7A and 7B are side views showing large and small tape cartridges according to a third embodiment of the present invention.
Figure 7B:
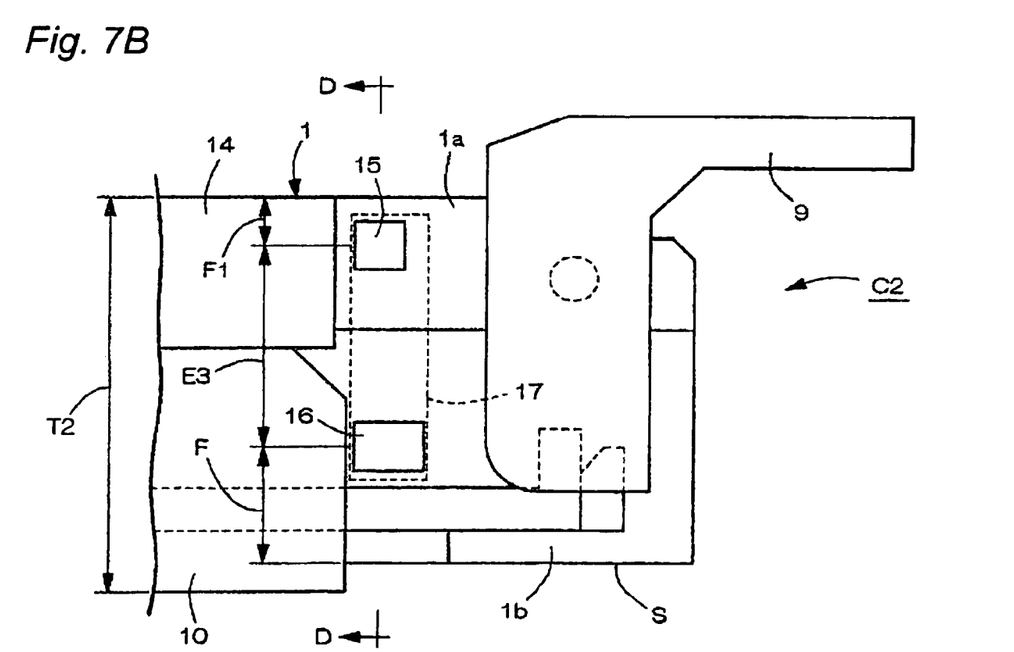

In the above-described tape cartridge of a compatible type, as shown in FIG. 7, defining any one of the upper an lower surfaces of the case of the main body 1 as a reference surface S, any one of the passages for light injection 15 and the passages for light ejecting 16 in the large and small tape cartridges C1 and C2 is formed at a prescribed distance F from the reference surface S, and upper and lower adjacent spaces E2 and E3 between the passages for light injection 15 and the passages for light ejecting 16 in the large and small tape cartridges C1 and C2 are different in response to a difference of widths and measurement of the case of the main body 1 between the large and small tape cartridges C1 and C2.

Figure 5A:
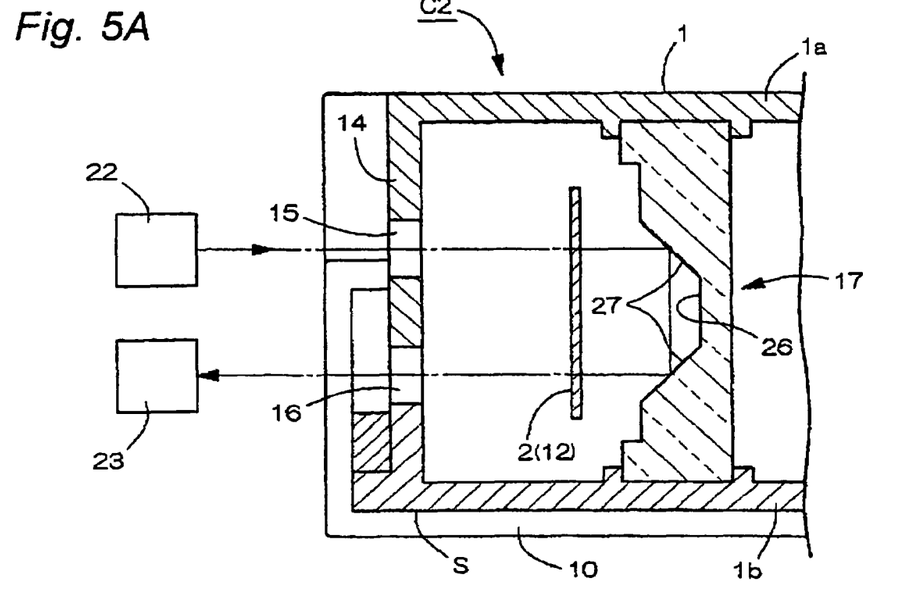
FIG. 5A is a cross sectional view taken on a line B-B shown in FIG. 4B
Figure 5B:
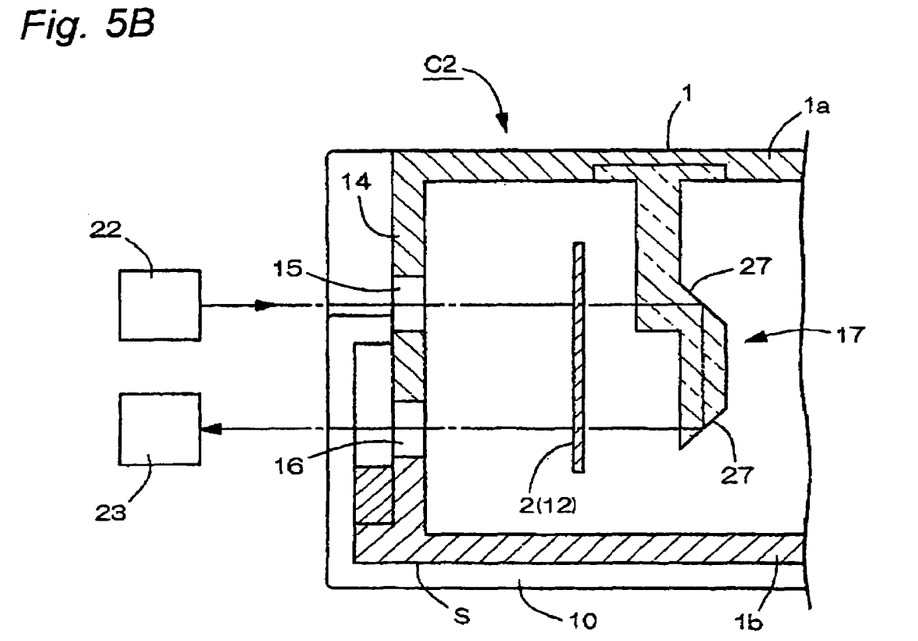
FIG. 5B is a same cross sectional view in another light path inverted body.

According to the first aspect of the present invention, with the small tape cartridge C1 or the large tape cartridge C2 mounted in the tape drive, with respect to the tape drive, the passages for light injection 15 and the passages for light ejecting 16 in the large and small tape cartridges C1 and C2 have a prescribed position relation. Accordingly, as show in FIG. 3 and FIG. 5, it is sufficient that a set of a light emitting element 22 and a light receiving element 23 is positioned on the right and left side of the tape drive respectively in response to the passage for light injection 15 and the passage for light ejecting 16, so that it is possible to simplify a tape end detection structure to be disposed on the side of the tape drive.

Figure 8:
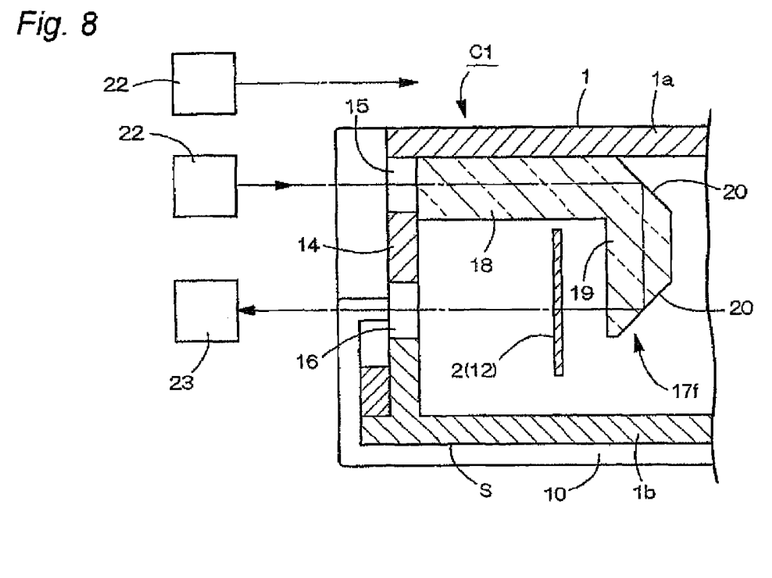
FIG. 8 is a cross sectional view taken on a line C-C shown in FIG. 7A.
Figure 9:
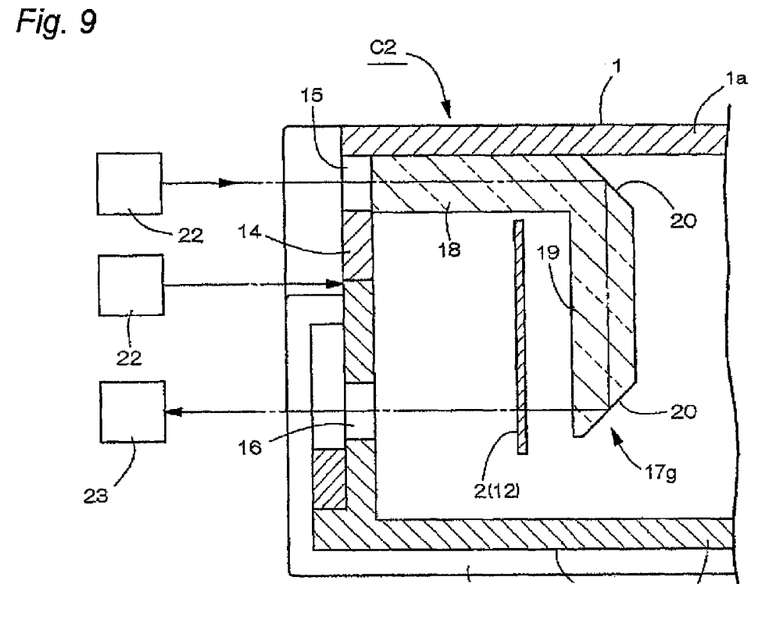
FIG. 9 is a cross sectional view taken on a line D-D shown in FIG. 7B.
Figure 10:
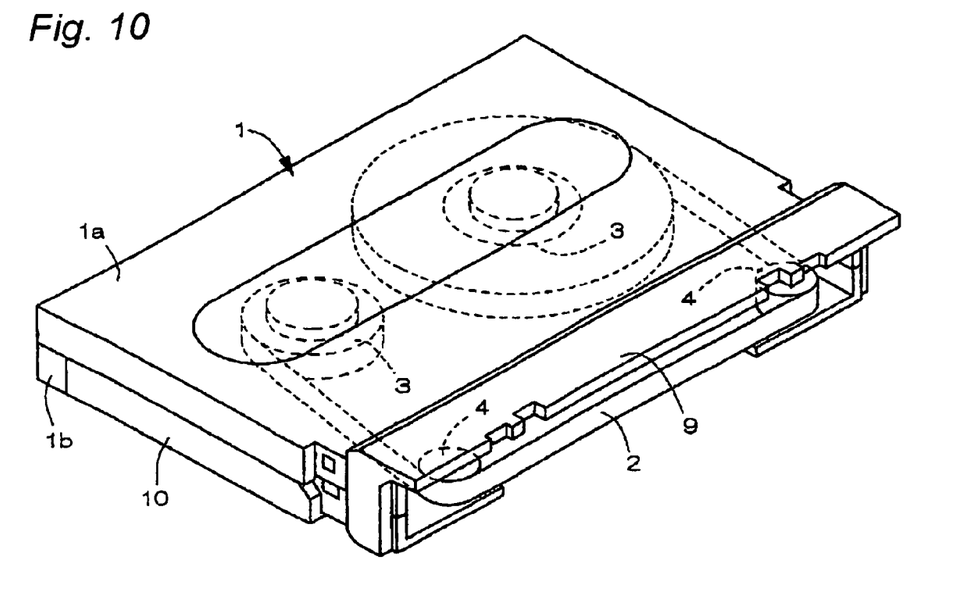
FIG. 10 is a perspective view showing a tape cartridge viewed from an upper part according to a forth embodiment of the present invention.
Figure 11:
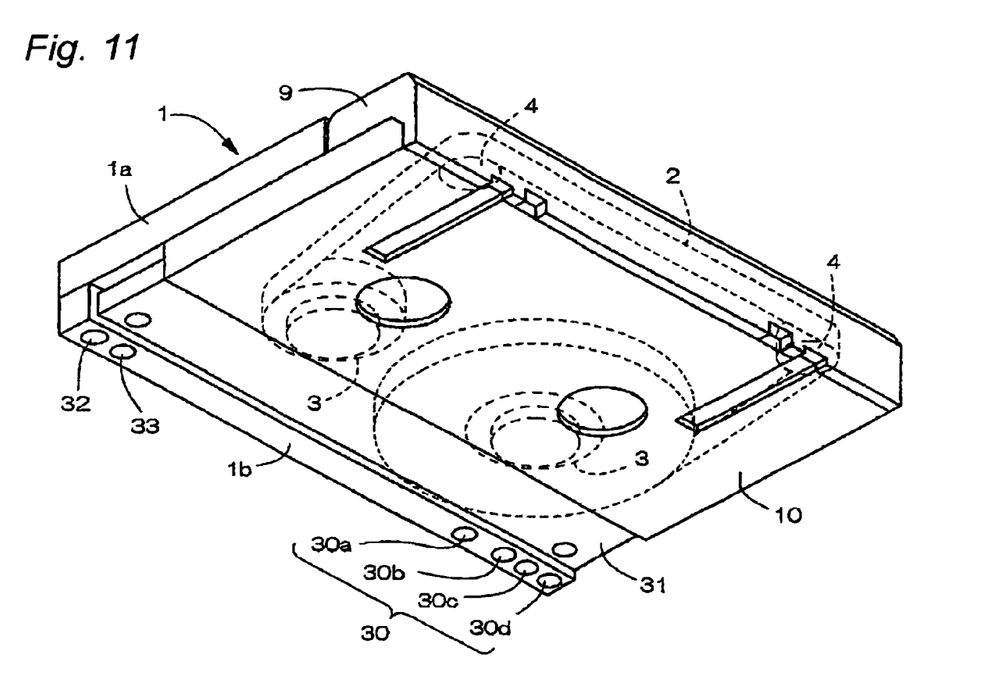
FIG. 11 is a perspective view showing the tape cartridge viewed from a lower part according to the forth embodiment of the present invention.
Figure 12:
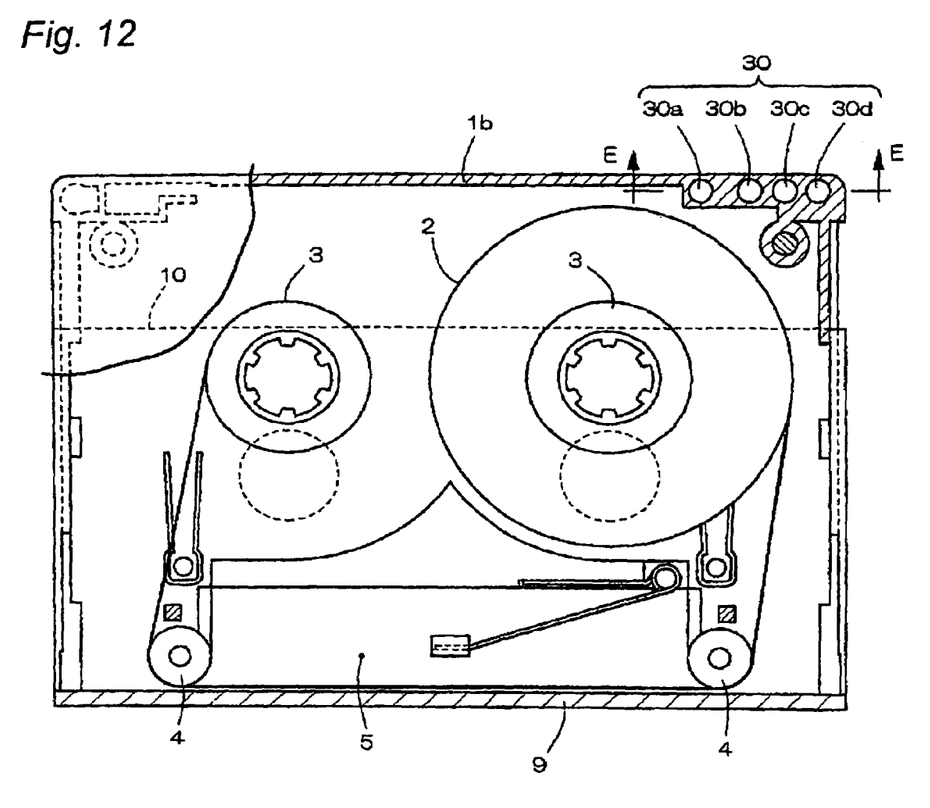
FIG. 12 is an inside plane view showing the tape cartridge according to the forth embodiment of the present invention.

According to the second aspect of the present invention, for example, when the passages for light ejecting 16 in the large and small tape cartridges C1 and C2 are located at the level of the prescribed distance F with the lower surface of the case of the main body 1 as the reference surface S, if the light receiving elements 23 on the side of the tape drive to face the passages for light ejecting 16 are positioned for each one on the right and left sides as shown in FIG. 8 and FIG. 9, the light receiving element 23 can correspond to the large and small tape cartridges C1 and C2. In this case, the height of the passage for light injection 15 viewed from the lower surface of the case of the main body 1 is different between the large and small tape cartridges C1 and C2, the light emitting elements 22 on the side of the tape drive may be positioned for two right and left or only one light emitting element 22 on right and left may be moved respectively. On the contrary, for example, when the passages for light injection 15 in the large and small tape cartridges C1 and C2 are located at the level of the prescribed distance F from the reference surface S with the upper surface of the case of the main body 1 as the reference surface S, the light emitting elements 22 on the side of the tape drive to face the passages for light injection 15 may be positioned for each one on the right and left sides. In this case, the light receiving elements 23 may be disposed right and left for each two. In any case, as compared to a conventional case such that two light emitting elements 22 and two light receiving elements 23 are disposed, it is possible to decrease the number of the sensor elements, and a complicated structure to move the light emitting element 22 and the light receiving element 23 individually is not needed.

BRIEF DESCRIPTION OF THE DRAWINGS

The above and other objectives and features of the present invention will become more apparent from the following description of preferred embodiments thereof with reference to the accompanying drawings throughout which like parts are designated by like reference numerals, and wherein.

DESCRIPTION OF THE PREFERRED EMBODIMENT(S)

Embodiment 1

Figure 3:
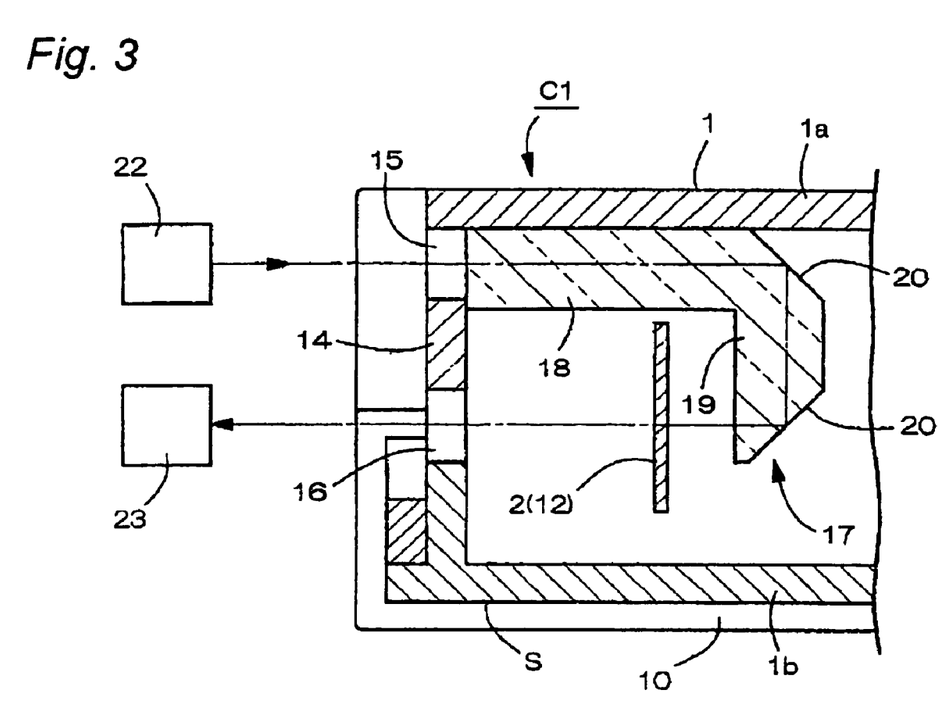
FIG. 3 is a cross sectional view taken on a line A-A shown in FIG. 4A.

FIGS. 1 to 5 show a first embodiment of a tape cartridge according to the present invention. FIGS. 1 to 3 show a tape cartridge C1 of a small size among tape cartridges of a compatible type. In this tape cartridge C1, a pair of right and left hubs 3 for winding a tape 2 is arranged in a case of a main body 1. A tape 2 winded off from one hub 3 is winded around the other hub 3 via tape guides 4 that are arranged on the front, right, and left of the case of the main body 1.

The case of the main body 1 is formed as a hollow box by connecting an upper case 1a and a lower case 1b that are divided into two upward and downward face-to-face. On a bottom wall of the lower case 1b, driving shaft insertion holes are opened corresponding to the right and left hubs 3 and 3.

Between right and left tape pullout ports, a pocket 5 for loading a tape of which lower surface and front surface are released, is provided. In front of the case of the main body 1, a front cover 9 to cover the front surface and the upper surface of the tape 2 when the tape cartridge is not used, is provided to be open and closed. On the lower surface of the case of the main body 1, a shutter 10 to cover the lower surface of the pocket 5 and the driving shaft insertion hole is provided.

The front cover 9 is swingably supported with respect to the case of the main body 1 as opened upward, and the front cover 9 is swung and closed by a spring. The shutter 10 is supported to the case of the main body 1 slidably back and forth to be closed by a spring. If the shutter 10 is released slidably backward on the case against the spring, the lower surface of the pocket 5 is released, and further, the driving shaft insertion hole is released.

As shown in FIG. 2, the start end and the terminal end of the tape 2 and the both hubs 3 are connected each other via a transparent leader tape 12, respectively. In order to detect the end of the tape by using this transparent leader tape 12, a tape end detection structure is provided in a tape traveling path that is set between the tape guide 4 and respective right and left hubs 3 and 3 so as to put the tape traveling path therebetween outwardly and inwardly.

In the tape end detection structure, as shown in FIG. 3, upper passages for light injection 15 and lower passages for light ejecting 16 are opened respectively on right and left side walls 14 of the case of the main body 1 facing a tape traveling path between respective right and left tape guides 4 and respective right and left hubs 3. Separately, a first light path inverted body 17 opposite to a pair of passages 15 and 16 across the tape traveling path is arranged in the case of the main body 1. In FIG. 4A, the passage for light injection 15 is formed as a square opening on the side of an upper case 1a, and the passage for light ejecting 16 is notched and formed as a rectangular opening on a contact surface of the upper and lower cases 1a and 1b.

The first light path inverted body 17a is composed of a prism that is made of a plastic material such as an acryl resin with a high transparency, and as shown in FIG. 3, the first light path inverted body 17a is provided with a horizontal lateral optical guide 18 of which one end is continued to the inside surface of the passage for light injection 15 and a vertical longitudinal optical guide 19 that is projected downward as continued from the inner end of the lateral optical guide 18 integrally. At the upper and lower ends of the inner side of the longitudinal optical guide 19, reflection surfaces 20 inclined against respective lateral and longitudinal optical guides 18 and 19 by 45 degrees are formed, respectively. The center position of the lower reflection surface 20 is located near the center of the upper and lower widths of the tape 2. The light path inverted body 17a is fixed to the inner surface of the upper wall of the upper case 1a by engaging or bonding via the longitudinal optical guide 18.

On the side of the tape drive, in correspondence to the passage for light injection 15 and the passage for light ejecting 16, a light emitting element 22 for irradiating the detection light and a light receiving element 23 for receiving the detection light are provided as positioned right and left. As shown in FIG. 3, the detection light irradiated from the light emitting element 22 to the longitudinal optical guide 18 via the passage for light injection 15 is guided to be redirected downward on the upper reflection surface 20, and then, the detection light is guided to be redirected laterally toward the outside of the case on the lower reflection surface 20.

This inversely guided detection light gets across the traveling path of the tape 2, so that only when the leader tape 12 gets across the traveling path, the detection light is detected by the light receiving element 23 via the passage for light ejecting 16. In other words, by detecting the detection light with the light receiving element 23, it is possible to know the start end or the terminal end of the tape 2 within the tape cartridge, and by this detection signal, the operation of feeding the tape, the winding operation, and the fast forwarding operation or the like can be automatically stopped.

Among the tape cartridges of the compatible type, the structure of the tape cartridge C2 of a large size is the same as the structure of the tape cartridge C1 of a small size, however, the tape cartridge C2 is different from the tape cartridge C1 in that the upper and lower widths of the tape 2 are set wider in order to increase capacity of recording and in response to this, the upper and lower width measurement T2 of the case of the main body 1, and the upper and lower measurements of the hub 3 and the tape guide 4 or the like are set larger. The longitudinal and lateral measurements of the case of the main body 1 are the same as those of the both cartridges C1 and C2 except for the widths T1 and T2 of the large and small tape cartridges C1 and C2.

In order to unify the tape end detection structures of the large and small tape cartridges C1 and C2 and to share the light emitting element 22 and the light receiving element 23 on the side of the tape drive by the large and small tape cartridges C1 and C2, according to the present invention, the passage for light injection 15 and the passage for light ejecting 16 are formed to be in a prescribed positional relation.

In other words, in the small tape cartridge C1 shown in FIG. 4A, when the passages for light ejecting 16 are formed at the level of the prescribed distance from the reference surface S with the lower surface of the case of the main body 1 as the reference surface S, also in the large tape cartridge C2, as shown in FIG. 4B, the passages for light ejecting 16 are formed at the level of the prescribed distance from the reference surface S with the lower surface of the case of the main body 1 as the reference surface S.

Additionally, as shown in FIGS. 4A and 4B, in the large and small tape cartridges C1 and C2, adjacent spaces E1 in the upper and lower directions between the passage for light injection 15 and the passage for light ejecting 16 are set to be equal, and opening shapes of respective passages 15 and 16 are formed to be the same shape and the same size in the large and small tape cartridges C1 and C2. Note that the passage for light injection 15 in the large tape cartridge C1 is formed by notching a joint surface between the upper case 1a and lower case 1b, and that the passage for light ejecting 16 passes through the lower case 1b.

As described above, the upper and lower widths T2 of the case of the main body 1 in the large tape cartridge C2 is wider than the width measurement T1 of the case of the main body 1 in the small tape cartridge Cl, and the width of the tape 2 in the large tape cartridge C2 is larger than that of the small tape cartridge C1. Therefore, in the large tape cartridge C2, a second light path inverted body 17b in place of a prism may inversely guide the detection light toward the outer surface of the case.

In FIG. 5A, the second light path inverted body 17b is made of a square pole plastic mold formed in a block. On the side surface directly opposing to the passage for light injection 15 and the passage for light ejecting 16, a trapezoidal recess portion 26 is formed, and at the upper and lower ends of the recess portion 26, reflection surfaces 27 corresponding to the above-described reflection surface 20 respectively are continuously formed. The reflection surfaces 27 are formed to be a flat surface which is inclined against a vertical surface and a horizontal surface by 45 degrees and its surface is mirror finished so as to enable to reflect the incident light mostly.

In FIG. 5B, there is shown another second light path inverted body 17c extended in a longitudinal direction for the detecting light passing through inside, which is made of a transparent plastic mold such as acrylic resin and which upper end is cantilevered at inside face of the upper case 1a. As shown in FIG. 5B, the second light path inverted body 17c comprise two reflection surfaces 27 which are formed on the inner side surfaces directly opposing to the passage for light injection 15 and the passage for light ejecting 16 and inclined against a vertical surface and a horizontal surface by 45 degrees.

As shown in FIGS. 5A and 5B, the detection light irradiated from the light emitting element 22 to the second light path inverted body 17b, 17c, respectively, via the passage for light injection 15 is guided to be redirected downward on the upper reflection surface 27, and then, the detection light is guided to be redirected laterally toward the outside of the case on the lower reflection surface 27. The incident detection light and the inversely guided detection light get across the traveling path of the tape 2, so that when the leader tape 12 gets across the traveling path, the detection light is detected by the light receiving element 23 via the passage for light ejecting 16.

As described above, if the light emitting element 22 and the light receiving element 23 are shared on the side of the tape drive by the large and small tape cartridges C1 and C2, the structure for detecting the tape end to be provided within the tape drive can be simplified, so that the entire cost of the tape drive can be decreased and the tape drive can be miniaturized.

Embodiment 2

Figure 6A:
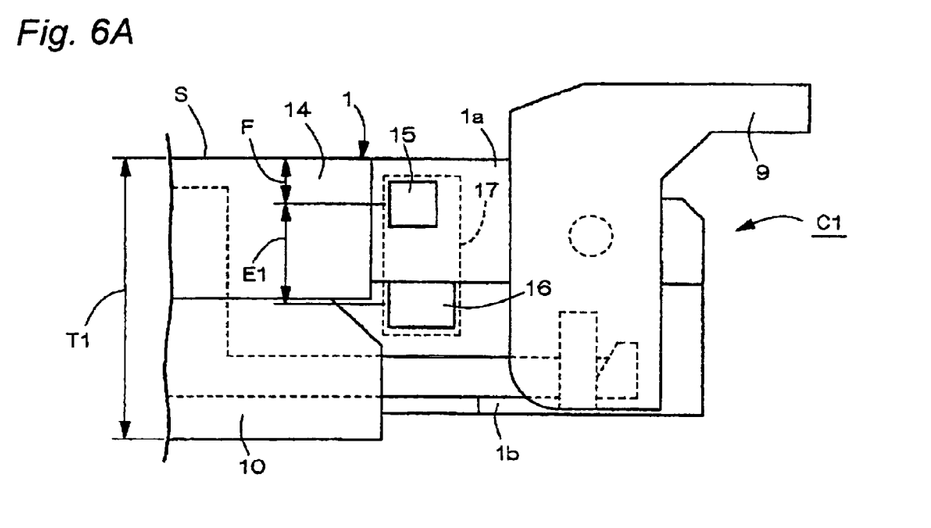
FIGS. 6A and 6B are side views showing large and small tape cartridges according to a second embodiment of the present invention.
Figure 6B:
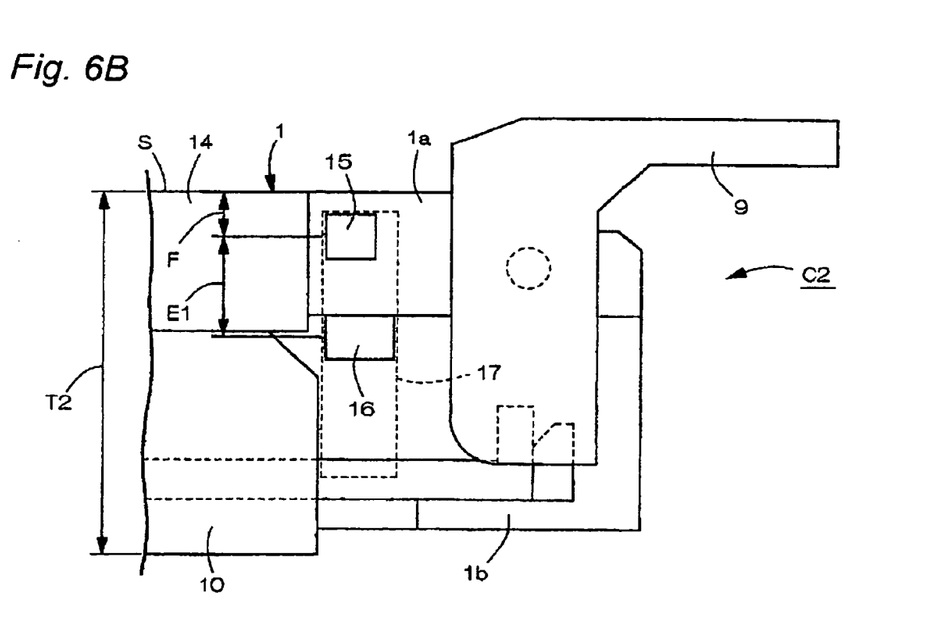

According to the above-described first embodiment, the levels of the passage for light injection 15 and the passage for light ejecting 16 are decided with the lower surface of the case of the main body 1 of the large and small tape cartridges C1 and C2 as the reference surface S, however, the upper surface of the case of the main body 1 of the large and small tape cartridges C1 and C2 may be defined as the reference surface S. FIGS. 6A and 6B show the second embodiment in this case, and the passage for light injection 15 is formed at the prescribed distance F lower from the reference surface 5, namely, the upper surface of the case. Additionally, in the large and small tape cartridges C1 and C2, the adjacent spaces E1 in the upper and lower directions between the passage for light injection 15 and the passage for light ejecting 16 are set to be equal. Since other structures are the same as the first embodiment, the same reference numerals are given to the same members and their explanations are herein omitted. Light path inverted bodies 17d and 17e, respectively, are shown in FIGS. 6A and 6B.

Embodiment 3

FIGS. 7 to 9 show a third embodiment of a tape cartridge according to the present invention. According to this third embodiment, in the above-described tape cartridge of the compatible type, as show in FIGS. 7A and 7B, the passages for light ejecting 16 of the large and small tape cartridges C1 and C2 are formed at the same levels at the prescribed distance F from the reference surface S with the lower surface of the case of the main body 1 as the reference surface S. Additionally, in the large and small tape cartridges C1 and C2, the adjacent spaces E1 and E2 in the upper and lower directions between the passage for light injection 15 and the passage for light ejecting 16 are set to be different in response to a difference of the upper and lower widths measurements of the cases of the main body 1 of the large and small tape cartridges C1 and C2.

In other words, in the small tape cartridge C1, the opening positions (namely, the adjacent space E2) of the passage for light injection 15 and the passage for light ejecting 16 are the same as the first embodiment. On the contrary, in the large tape cartridge C2, the adjacent space E3 between the passage for light injection 15 and the passage for light ejecting 16 is larger than the E2. More specifically, the passages for light injection 15 of the large and small tape cartridge C1 and C2 are formed downward at the same distance F1 from the upper surface of the case of the main body 1. In the meantime, the light path inverted body 17g of the large tape cartridge C2 uses a prism that the longitudinal optical guide 19 is vertically longer than the light path inverted body 17f. Other structures are substantially the same as the first embodiment, so that the same reference numerals are given to the same members.

Right and left of the tape drive according to the third embodiment, two of first and second light emitting elements 22 are positioned upward and one light receiving element 23 is positioned downward. If the small tape cartridge 1 is mounted in this tape drive, as shown in FIG. 8, the detection light entering the light path inverted body 17f from the first light emitting element 22 located at the lower side via the passage for light injection 15 is detected by the light receiving element 23. On the other hand, if the large tape cartridge C2 is mounted in the tape drive, as shown in FIG. 9, the detection light entering the light path inverted body 17g from the second light emitting element 22 located upper than the first light emitting element 22 via the passage for light injection 15 is detected by the same light receiving element 23.

As being obvious from this, according to the third embodiment, it is sufficient that the light receiving element 23 is positioned for each one right and left of the tape drive. In this time, preparing the light emitting element 22 to move up and down for each one right and left of the tape drive, in the large and small tape cartridges C1 and C2, the upper and lower positions of the light emitting element 22 may be switched.

Other Embodiment

According to the third embodiment, the passages for light injection 15 in the large and small tape cartridges C1 and C2 are formed at the same levels at the prescribed distance F from the reference surface S with the lower surface of the case of the main body 1 as the reference surface S, and the upper and lower adjacent spaces E2 and E3 between the passages for light injection 15 and the passages for light ejecting 16 in the large and small tape cartridges C1 and C2 may be different in response to a difference of widths and measurement of the base of the main body 1 between the large and small tape cartridges C1 and C2. The tape drive in this case can be formed to fix one light emitting element 22 and two light receiving elements 23 right and left, respectively. Further, only one light receiving element 23 is fixed right and left of the tape drive, and setting the light receiving surface of this light receiving element 23, the upper and lower thickness is made wider to fix the light receiving element 23.

The present invention can be applied to a tape cartridge of other compatible system of which widths measurement of the case of the main body 1 is different other than the tape cartridge described in the above-described embodiment, and further, the present invention can be also applied to the tape cartridge of three and more classifications of compatible types of which width measurement of the case of the main body 1 are different. It is possible to select any shape such as a square and a polygon or the like as the passage for light injection 15 and the passage for light ejecting 16.

The light path inverted body 17f in the small tape cartridge C1 may be formed in a block and the light path inverted body 17g in the large tape cartridge C2 may be formed in a prism. The leader tape 12 is not necessarily a transparent tape. For example, by forming a passage and a slit passing light there through at a predetermined interval on an opaque tape so as to make a leader tape.

Embodiment 4

Such kind of tape cartridge is provided with an identification hole 30 for identifying the class information specific to the tape cartridge such as a kind of the tape 2 and a length of the tape 2 or the like on the side of a tape deck. FIGS. 10 to 13 show a fourth embodiment of the present invention with related to this identification hole 30.

For example, JP-A-2000-100120 discloses a tape cartridge that a plurality of identification holes for detecting the class information of a cartridge such as a kind of tape and a classification of format or the like on the side of a tape deck is provided at a bottom wall of a case of a main body and the kind of the cartridge can be specified on the side of the tape deck on the basis of a combination of open and close states of each identification hole, namely, with or without of the identification hole. Specifically, due to the combination of open and close states of four identification holes, eight classifications of cartridges (a kind of leaning tape) can be specified.

The inventors of the present invention is studying about making a relative compact tape cartridge such as a DAT (Digital Audio Tape) and a DDS (Digital Data Storage) for backup of the computer data developed on the basis of the DAT, namely, enabling to identify various information of the cartridge such as a classification and a length and a size of tape and a kind and a size of tape cartridge on the side of the tape deck. However, in such a case, according to the embodiment of identification described in the above-described patent document, if the classification information of the tape offered to the side of the deck is increased, the number of the identification hole should be extremely increased in response to this, so that this involves a problem that it is difficult to secure an area of setting the identification hole on the outer surface of the case of the main body.

Therefore, in order to acquire the classification information of the cartridge such as the classification and the length of the tape or the like relatively reliably on the side of the tape deck without increasing the number of the identification hole, the fourth embodiment of the present invention may provide an identification system of the kind of the tape which is suitable for the relative compact tape cartridge such as a DAT and a DDS.

Therefore, as shown in FIGS. 10 to 13, a plurality of identification holes 30 for identifying the classification information specific to the tape cartridge such as the kind of the tape 2 and the length of the tape 2 on the side of the tape deck is formed on the outer surface of the case of the main body 1. These identification holes 30 may correspond to one of classification information respectively and a depth measurement of each identification hole 30 is set to be long or short in response to the corresponding classification information. Then, by detecting the depth measurements of these identification holes 30, the classification information of the tape cartridge can be acquired on the side of the tape deck. These identification holes 30 can be arranged in a right and left direction near to one right end or one left end of the rear end of the case of the main body 1.

According to such an identification system of the tape, since it is assumed that each identification hole 30 corresponds to one of classification information and the depth measurement of each identification hole 30 is set to be large and small in response to the corresponding classification information, the identification holes 30 for the number of the classification information to be supplied to the side of the tape deck are sufficient. As a result, as compared to the conventional embodiment of specifying the kind of the tape cartridge on the basis of a combination of the open and close state of the identification hole, it is possible to suppress the number of the identification holes 30 to be provided on the outer surface of the case of the main body 1. Accordingly, it is possible to obtain a tape cartridge, which can suppress a setting space of the identification hole 30 to the minimum, can provide the identification hole 30 on the outer surface of the case of the main body 1 without problems, and is suitable for transmitting abundant information such as a classification and a length of the tape 2 to the tape deck. In addition, since the setting space of the identification hole 30 can be suppressed to the minimum, this identification system of the kind of the tape can sufficiently cope with the relative compact tape cartridge such as the DAT and the DDS.

In other words, for example, in the case that there are six kinds of the tape and six kinds of the lengths of the tape, if the kind of the tape cartridge is specified depending on a combination of the open and close states of the identification hole as the conventional embodiment, there are thirty-six kinds of the combinations of the kind of the tape and the lengths of the tape, so that at least six identification holes should be provided and it is not easy to secure the setting space of the identification hole on the outer surface of the case of the main body. On the contrary, if the depth measurement of each identification hole 30 is set to be large and small in response to the corresponding classification information assuming that each identification hole 30 corresponds to one of the classification information respectively as the present invention, according to the above-described example, two identification holes 30 are enough and the setting spaces of these holes are small. The depth measurement of each identification hole 30 is set at any of the depth measurements of six stages in response to the kind and the length of the tape.

If identification holes 30a to 30d are arranged near in a right and left direction near to one right end or one left end of the rear end of a bottom wall 31 of the case of the main body 1, a detecting part on the side of the tape deck can be miniaturized, so that the present embodiment can contribute to saving of a space of the tape deck and miniaturization of the tape deck. Conventionally, a positioning hole 32 and a writing inhibition identifying hole 33 or the like are provided at the rear end of the bottom wall 31, so that it is also possible to suppress change of design of the detecting part on the side of the tape deck to the minimum and to suppress increase of a manufacturing cost of the tape deck. In addition, if the identification hole 30 is provided at the above-described place, this is not so visible and an exterior appearance of the tape cartridge is not so damaged.

More specifically, in the tape cartridge of the DAT system shown in FIGS. 10 to 13, according to the present embodiment, the identification holes 30 (30a to 30d) for detecting the classification information specific to the tape cartridge such as the kind of the tape 2, the length of the tape 2, the size of the tape cartridge, and the kind of the tape cartridge on the side of the tape deck are arranged in the right and left direction near to one right end or one left end of the rear end of the bottom wall 31 of a lower case 1b. Each of identification holes 30a to 30d corresponds to one identification information. Specifically, it is assumed that the identification hole 30a specifies the kind of the tape 2, the identification hole 30b specifies the length of the tape 2, the identification hole 30c specifies the size of the tape cartridge, the identification hole 30c specifies the size of the tape cartridge, and the identification hole 30d specifies the kind of the tape cartridge.

In this case, the kind of the tape 2 means a recording density and a compression rate of the tape 2. The length of the tape 2 means an entire measurement of the tape 2 belonged to the tape cartridge. Depending on these information about the length of the tape 2 and the variety information of the tape 2, a recording capacity of the tape cartridge can be specified. The size of the tape cartridge means the widths measurement of the case of the main body 1. For example, the kind of the tape cartridge means a difference of the DAT and the DDS. Thus, the DAT and the DDS are necessarily distinguished because the DDS is developed on the basis of the DAT and the external appearance of the case of the main body 1 is substantially the same between them.

Figure 13:
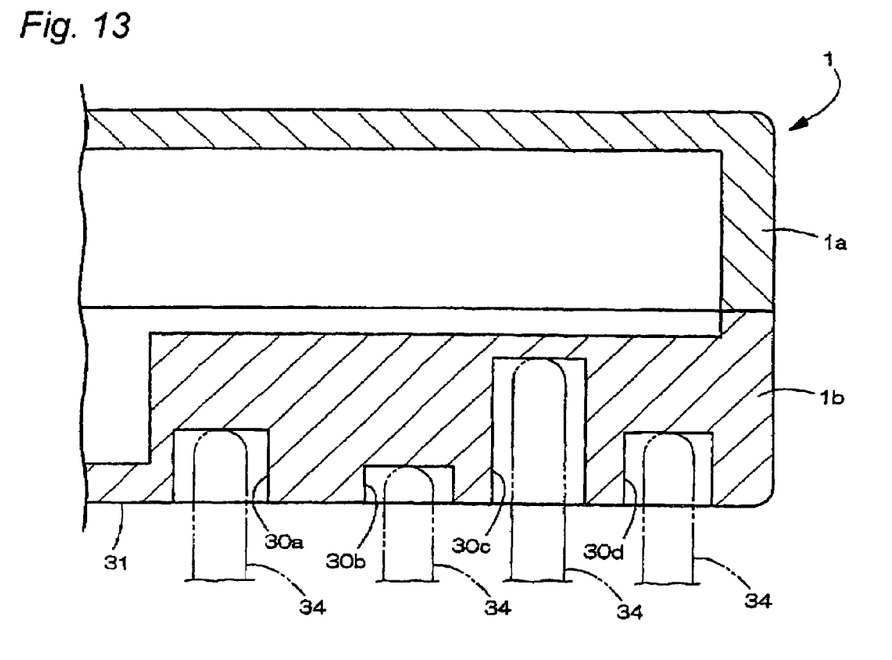
FIG. 13 is a cross sectional view taken on a line E-E shown in FIG. 12.

Additionally, according to the present embodiment, as shown in FIG. 13, the depth measurements of respective identification holes 30a to 30d are set to be large and small in response to the corresponding classification information, so that it is noted that the classification information of the tape cartridge is acquired on the side of the tape deck by detecting the depth measurements of these identification holes 30a to 30d.

More specifically, by correlating the depth measurements of respective identification holes 30a to 30d with the corresponding identification information step by step and detecting the depth measurements of respective identification holes 30a to 30d on the side of the tape deck, the classification information of the tape cartridge can be acquired on the side of the tape deck. In other words, for example, in the case that there are six kinds of the tape, namely, No. 1 to No. 6, it is ruled that the depth measurement is made larger step by step in response to the kind of the tape 2 in such a manner that the depth measurement of the identification hole 30a is defined as 1 mm in the No. 1 of the tape 2, as 2 mm in the No. 2 of the tape 2, and as 6 mm in the No. 6 of the tape 2 (however, the depth measurement may be made smaller in such a manner that the depth measurement of the identification hole 30a is defined as 6 mm in the No. 1 of the tape 2 and as 1 mm in the No. 2 of the tape 6). Thereby, by detecting the depth measurement of the identification hole 30a on the side of the tape deck, the kind of the tape 2 can be specified easily and reliably. The length information of the tape 2 may be set so that the depth measurement of the identification hole 30b is different step by step in response to the length thereof as same as the above-described variation of the tape 2. With respect to the kind of the tape cartridge (DDS and DAT), the depth measurement of the identification hole 30d may be set in two steps. The above-described changing of the depth measurements of the identification holes 30a to 30d can be realized by nesting metal molds for molding the lower case 1b inside one another and exchanging them for each classification.

As a detection system of the depth measurements of the identification holes 30a to 30d by the tape deck, a mechanical system for detecting the depth measurements of the identification holes 30a to 30d by contacting an expansible protruding pin 34 with the back surfaces of the identification holes 30a to 30d as shown in FIG. 13, a reaction force measuring system for detecting the depth measurements of the identification holes 30a to 30d on the basis of the reaction force received by the expansible protruding pin 34, and further, an optical system using a laser beam or the like are available.

The present invention can be adopted to a tape cartridge for backup of the computer data or the like in addition to the tape cartridge of the DAT system that is described with reference to the above-described embodiments. The number of the identification hole 30 is not limited to four and it may be three or four and more. In addition, the corresponding classification information of respective identification holes 30a to 30d are not limited to the above-described embodiments and they can be arbitrarily changed.

What is claimed is:

1. A compatible type tape cartridge capable of recording and reading out large and small tape cartridges with different widths in common with a same tape driver, comprising:

a pair of right and left hubs for winding a tape arranged in a case of a main body, said pair of hubs being designed so that tape wound off from one hub is wound around the other hub via tape guides arranged on the front, right, and left of said case of said main body and also being connected with start and terminal ends of said tape via leader tapes, a passage for light injection and a passage for light ejecting of a tape end detection light opened respectively on a side wall of said case of said main body facing a tape traveling path between said tape guide and said hub, and an optical path inverted body facing said passages and across a tape traveling path arranged in said case of said main body, wherein defining one of upper and lower surfaces of said case of said main body as a reference surface, the passages for light injection and light ejecting in the large and small tape cartridges are formed at a prescribed distance from said reference surface, and upper and lower adjacent spaces between the passages for light injection and light ejecting in the large and small tape cartridges are set at substantially the same distance.

2. A compatible type tape cartridge according to claim 1, wherein the passage for light injection is opened at an upper part and the passage for light ejecting of the tape end detection light is opened at a lower part respectively on right and left side walls of said case of said main body, and wherein defining a lower surface of the case of said main body as a reference surface, the passages for light ejecting in the large and small tape cartridges are formed at a prescribed distance from the reference surface.

3. A compatible type tape cartridge according to claim 1 or 2, further comprising a first light path inverted body comprising a prism comprised of a transparent plastic material, and said first light path inverted body is provided with a horizontal lateral optical guide having one end extending to an inside surface of the passage for light injection and a vertical longitudinal optical guide projected downward extending from an inner end of the lateral optical guide integrally, wherein at upper and lower ends of an inner side of said longitudinal optical guide, reflection surfaces inclined against respective lateral and longitudinal optical guides by 45 degrees are formed respectively.

4. A compatible type tape cartridge according to claim 1 or 2, further comprising a second light path inverted body comprising a square pole plastic mold formed in a block, and on side surfaces directly opposing the passage for light injection and the passage for light ejecting, trapezoidal recess portions are formed, and at upper and lower ends of a recess portion, reflection surfaces are formed and inclined against a vertical surface and a horizontal surface by 45 degrees.

5. A compatible type tape cartridge according to claim 1, wherein a plurality of identification holes for identifying classification information specific to said tape cartridge are formed on the outer surface of the case of said main body, and each of said identification holes corresponds to classification information so as to set a depth measurement of each identification hole to be long or short in response to corresponding classification information, whereby detection of the depth measurements of said identification holes gives classification information of the tape cartridge on the side of the tape deck.

6. A compatible type tape cartridge according to claim 5, wherein identification holes are arranged in a right and left direction near to one right end or one left end of the rear end of the case of the main body.

* * * * *